(12) United States Patent
Jackson, II et al.

(10) Patent No.: US 11,704,227 B2
(45) Date of Patent: Jul. 18, 2023

(54) VIRTUAL TIME TEST ENVIRONMENT

(71) Applicant: The Johns Hopkins University, Baltimore, MD (US)

(72) Inventors: Gary L. Jackson, II, Laurel, MD (US); Sterling E. Vinson, II, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 17/358,134

(22) Filed: Jun. 25, 2021

(65) Prior Publication Data
US 2022/0114080 A1 Apr. 14, 2022

Related U.S. Application Data

(60) Provisional application No. 63/091,346, filed on Oct. 14, 2020.

(51) Int. Cl.
| | |
|---|---|
| *G06F 11/00* | (2006.01) |
| *G06F 11/36* | (2006.01) |
| *G06F 9/455* | (2018.01) |
| *G06F 11/14* | (2006.01) |

(52) U.S. Cl.
CPC ...... *G06F 11/3664* (2013.01); *G06F 9/45558* (2013.01); *G06F 11/1469* (2013.01); *G06F 2009/45591* (2013.01); *G06F 2201/84* (2013.01)

(58) Field of Classification Search
CPC .......... G06F 11/3664; G06F 11/14689; G06F 2009/45591; G06F 2201/84
USPC ....................................................... 714/1–57
See application file for complete search history.

(56) References Cited

U.S. PATENT DOCUMENTS

| | | | | |
|---|---|---|---|---|
| 10,678,666 | B1* | 6/2020 | Gauf ................... | G06F 11/2635 |
| 2006/0143596 | A1* | 6/2006 | Miyashita ........... | G06F 11/3612 |
| | | | | 717/131 |
| 2008/0065941 | A1* | 3/2008 | Lammel .............. | G06F 11/3676 |
| | | | | 714/746 |
| 2013/0262931 | A1* | 10/2013 | Siddalingesh ...... | G06F 11/3672 |
| | | | | 714/E11.178 |
| 2015/0205658 | A1* | 7/2015 | Towata ................... | G06F 11/30 |
| | | | | 714/47.3 |
| 2015/0212906 | A1* | 7/2015 | Gschwind ........... | G06F 11/1474 |
| | | | | 714/15 |

(Continued)

*Primary Examiner* — Sarai E Butler
(74) *Attorney, Agent, or Firm* — Sung T. Kim

(57) ABSTRACT

A test environment apparatus having processing circuitry is provided for testing an embedded system-under-test. The processing circuitry may be configured to implement the system-under-test for interaction with external test participants via messaging and control operation of an inner agent and an outer agent. The inner agent may be implemented within a virtual machine that is also implementing the system-under-test and the outer agent may be implemented external to the virtual machine implementing the system-under-test. The inner agent and the outer agent may be controlled to operate collaboratively to trigger captures of snapshots that store current states of the system-under-test at respective times and trigger a rollback of the system-under-test based on a timestamp of a delayed message using a snapshot for a selected time that provides a state of the system-under-test prior to the timestamp to permit subsequent delivery of the delayed message with the system-under-test in a rollback state.

20 Claims, 6 Drawing Sheets

(56) References Cited

U.S. PATENT DOCUMENTS

| | | | | |
|---|---|---|---|---|
| 2015/0347280 | A1* | 12/2015 | Bennah | G06F 11/2284 |
| | | | | 714/38.1 |
| 2016/0321145 | A1* | 11/2016 | Fang | G06F 11/1451 |
| 2017/0060720 | A1* | 3/2017 | Ramanath | H04L 43/20 |
| 2019/0392001 | A1* | 12/2019 | Carothers | G06N 3/084 |
| 2020/0028772 | A1* | 1/2020 | Laslau | H04L 41/40 |
| 2020/0051019 | A1* | 2/2020 | Kamani | H04L 51/046 |
| 2022/0066806 | A1* | 3/2022 | Ramanathan | G06F 12/1027 |

* cited by examiner

VIRTUAL TIME TEST ENVIRONMENT

CROSS-REFERENCE TO RELATED APPLICATIONS

This application claims the benefit of U.S. Provisional Application No. 63/091,346 filed on Oct. 14, 2020, the entire contents of which are hereby incorporated herein by reference.

STATEMENT REGARDING FEDERALLY SPONSORED RESEARCH OR DEVELOPMENT

This invention was made with Government support. The Government has certain rights in the invention.

TECHNICAL FIELD

Exemplary embodiments of the present disclosure generally relate to device testing environments, and more specifically relate to systems, apparatuses, and methods for implementing device testing in association with simulated events.

BACKGROUND

Devices implementing embedded software (or embedded systems) have become ubiquitous and there is an increasing desire to integrate embedded software into many everyday consumer products like cars, building management system devices, spacecraft, and other systems. Testing embedded software can be critical because it may be implemented in applications where life and property can be put at risk. As such, being able to consider real-world scenarios prior to application of a device in field testing and under real-world conditions is important. Additionally, field testing, and in particular, environmentally controlled field testing, can often be expensive or even impractical for certain modes of testing and devices. While testing such embedded systems in isolated test environments with isolated, fixed serial scenarios may be a relatively simple approach, such testing is insufficient for many stages of testing because such scenarios may not closely simulate real-world parallel and interrelated stimuli and the timing associated with such stimuli. Testing with dynamically changing scenarios can more closely simulate real-world conditions, but implementation of such testing is substantially more difficult. This is partly due to dynamic stimuli generated by simulation models that can take substantially longer (more time) to generate for use in a test, relative to real-world timing of events. As such, complex dynamic stimuli test environments may be inconsistent with real-world timing conditions.

BRIEF SUMMARY OF SOME EXAMPLES

According to some example embodiments, a test environment apparatus is provided for testing an embedded system-under-test. The test environment apparatus may comprise processing circuitry configured to implement the system-under-test for interaction with external test participants via messaging, and control operation of an inner agent and an outer agent. The inner agent may be implemented within a virtual machine that is also implementing the system-under-test and the outer agent may be implemented external to the virtual machine implementing the system-under-test. The outer agent may be configured to trigger captures of snapshots that store current states of the system-under-test at respective times, and forward a timestamped inbound message to the inner agent. The inner agent may be configured to receive the timestamped inbound message and evaluate the timestamp, and in response to the timestamp indicating a past time, reject the timestamped inbound message by sending a rejection to the outer agent. The outer agent may be further configured to, in response to the rejection, trigger a rollback of the system-under-test based on the timestamp using a snapshot for a selected time providing a state of the system-under-test prior to the timestamp and redeliver the timestamped inbound message to the inner agent to re-evaluate the timestamp.

According to some example embodiments, an example method implemented within a test environment apparatus for testing an embedded system-under-test is provided. The example method may comprise implementing, by a virtual machine operating on processing circuitry, the embedded system-under-test for interaction with external test participants via messaging. The example method may also comprise controlling operation of an inner agent and an outer agent. The inner agent may be implemented within the virtual machine that is also implementing the system-under-test and the outer agent may be implemented external to the virtual machine implementing the system-under-test. The example method may further comprise triggering, by the outer agent, snapshots that store current states of the system-under-test at respective times, and forwarding, by the outer agent, a timestamped inbound message to the inner agent. Additionally, the example method may comprise receiving, by the inner agent, the timestamped inbound message and evaluating the timestamp, and, in response to the timestamp indicating a past time, rejecting the timestamped inbound message by sending, by the inner agent, a rejection to the outer agent. Further, the example method may comprise triggering, by the outer agent in response to the rejection, a rollback of the system-under-test based on the timestamp using a snapshot for a selected time providing a state of the system-under-test prior to the timestamp, and redelivering, by the outer agent, the timestamped inbound message to the inner agent to re-evaluate the timestamp.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 3:
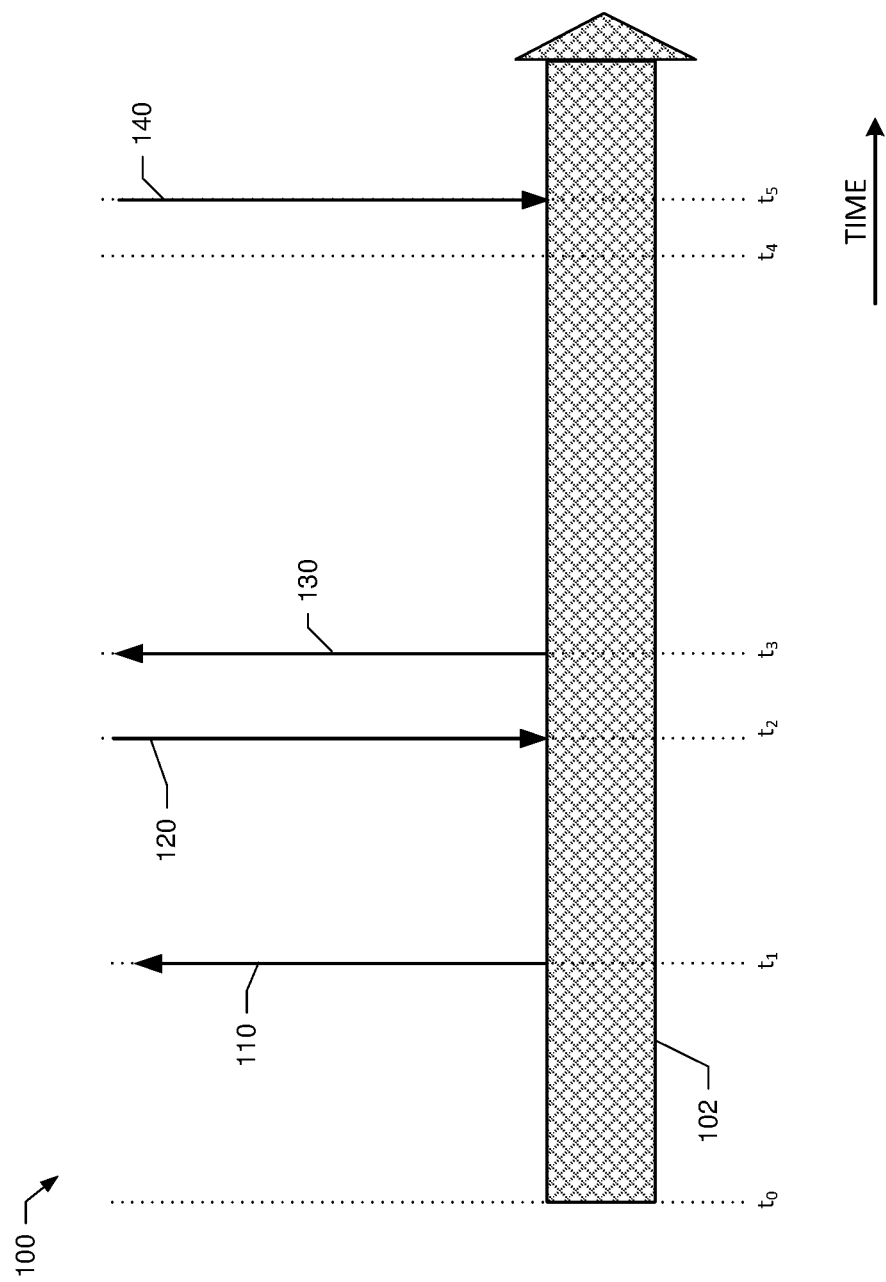
FIG. 3 illustrates a message timing diagram for an example scenario implemented by a system-under-test according to some example embodiments.
Figure 5:
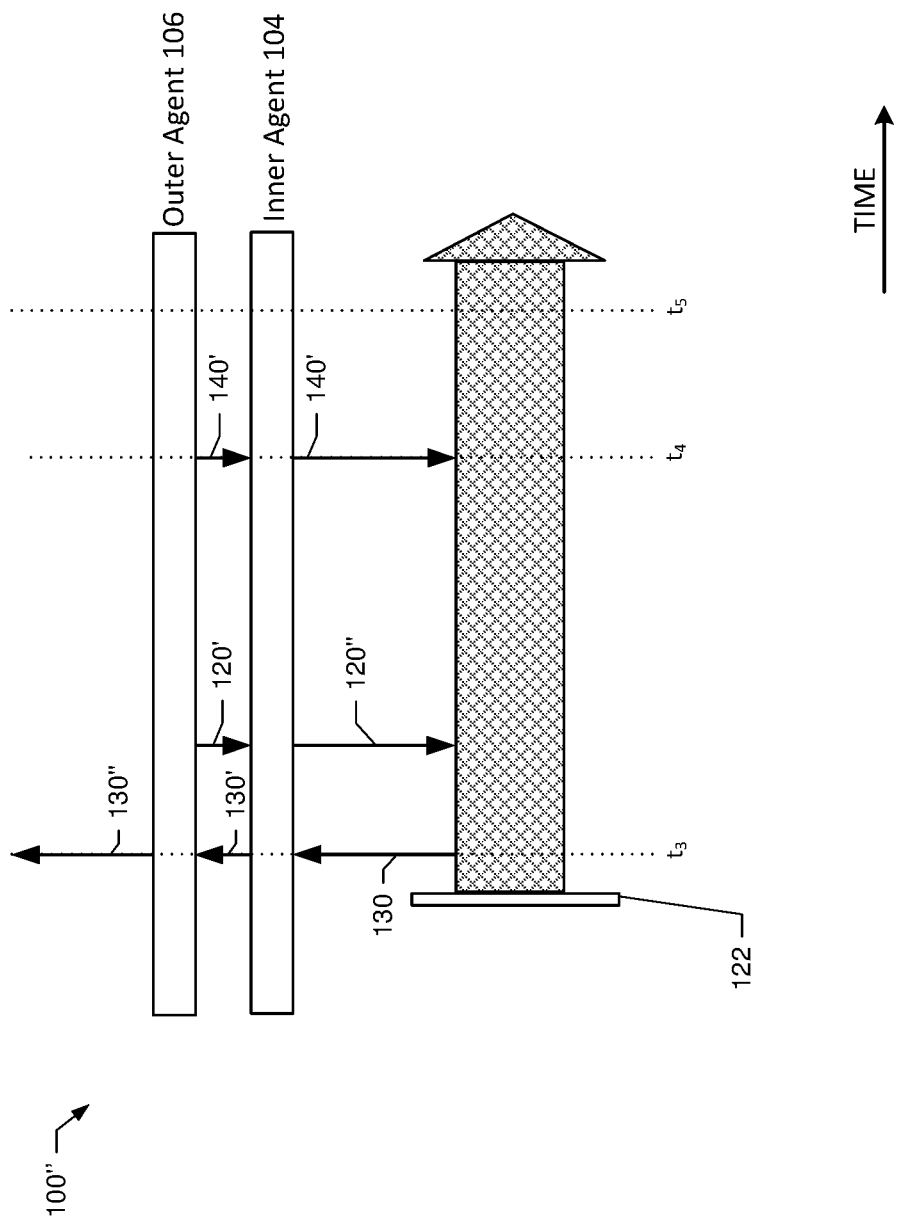
Figure 6:
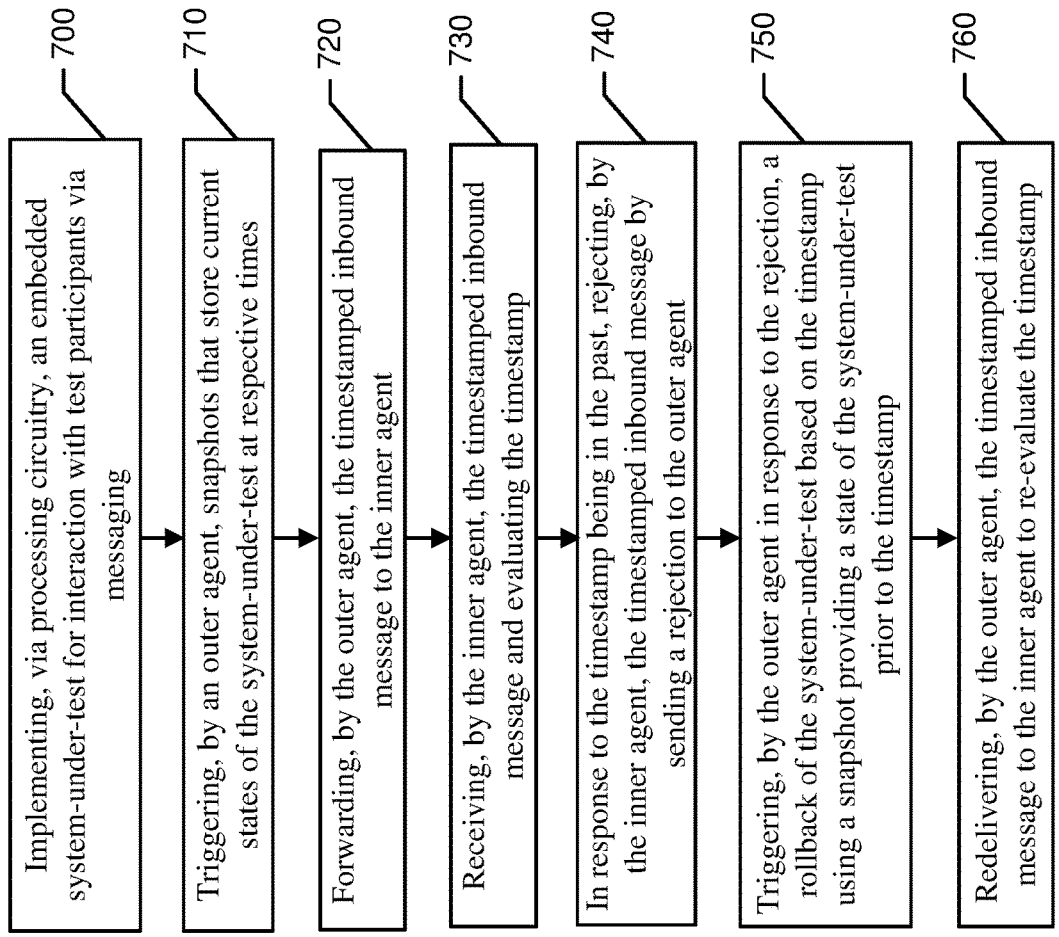

FIG. 5 illustrates a message timing diagram for the example scenario of FIG. 3 implemented by the system-under-test with an example test environment apparatus after a virtual time rollback has been implemented according to some example embodiments; and FIG. 6 illustrates a flow chart of an example method for testing a system-under-test while implementing a virtual time rollback according to some example embodiments.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

The ability to thoroughly test embedded software systems has become increasingly important to ensure that those systems achieve critical goals that accurately simulate realistic or real-world conditions. One can clearly see this importance in the context of, for example, systems that support the operation of autonomous vehicles. Examples of such embedded systems, executing embedded software, may rely on, and many behaviors may be dictated by, the operation of a system clock. The system clock may operate and be considered with respect to the timing of real-world events and the behaviors that may be employed in the context of real-world events.

To test such embedded systems in consideration of real-world events, one option is to perform actual field tests of the systems. However, real-world field testing has a number of drawbacks, such as being expensive with respect to cost and time. As a result, exhaustive tests or statistically characterizing behavior with a large number of field tests may become undesirable and often impractical. Additionally, true reproducibility of field tests can be difficult, particularly in the context of attempting to create black swan behaviors, since real-world environments may not provide the exact same conditions in a repeatable fashion for testing.

Due to these and possibly other issues with real-world field testing, simulation testing of systems can be more desirable. However, an issue arises in the context of simulation testing when the simulated environment can operate slower than real-time. In many instances, to simulate real-world conditions, computerized models of real-world environments must be developed and implemented. However, such models may generate and output simulated events slower than real-world events would occur, particularly when non-sequenced dynamic events are being generated for simulation.

As such, according to various example embodiments, a system and software test environment apparatus is provided that can operate, particularly with respect to the timing of events, to cause the system-under-test to be subjected to conditions that more closely simulate real-word events and associated timing of those events. As mentioned above, embedded software testing involving non-scripted, dynamic, and unpredictable stimuli, for example, embodied as inbound and outbound messaging to the system-under-test, can be difficult to simulate due to timing delays in the simulation models. In this regard, in a test environment, a system-under-test may be subjected to interact with such external models for the purpose of simulating real-world conditions. Such models can require processing time to generate the dynamic events to be imposed on the system-under-test that are attempting to simulate real-world events. As such, while the event itself may be simulated with accuracy, the timing of the simulated event may be delayed, and therefore the ability to truly simulate the event is lost. Such delays may not only affect the timing of the particular event itself, but may also affect the system-under-test's inactions with subsequent related or unrelated events, resulting in a snowball effect of inaccuracy relative to real-world conditions and behaviors.

As such, to alleviate this and other issues associated with testing of embedded systems, various example embodiments are configured to implement a technique for rolling back time, in a virtual sense, to compensate for the delays that may occur and are inconsistent with an accurate real-world simulation. To do so, according to some example embodiments, the system-under-test interacts via intermediaries, in the form of an inner agent and an outer agent, that operate to track and store snapshots of the state of the system-under-test over time and also timestamp stimuli (or messages) that are being imposed on, or received from, the system-under-test. Via the evaluation of timestamps, timing expectations for message delivery and response may be determined, and, in instances where the receipt of messages does not align with the timing expectations (e.g., the message should have been received in the past), a rollback can be performed to revert the system-under-test back to an earlier state as defined by an appropriate snapshot. The delayed message may then be sent such that, from the system-under-test's perspective (now implementing in the context of a virtual time), the message was received at a time that is consistent with the timing of a real-world event.

The ability to virtually rollback time, according to various example embodiments, constitutes an improvement in the operation of the computing technology by reducing the time and complexity that may be required to implement conventional solutions that attempt to simulate real-time events. In this regard, by configuring, for example, the processing circuitry of a test environment apparatus to perform such virtual time rollbacks, the real-world simulation techniques can be realized that could not have previously been performed, regardless of the processing power that may have been employed. As such, various example embodiments can be implemented to improve the ability of processing circuitry to perform embedded system testing operating on dynamic simulated stimuli at an overall more rapid rate, with higher repeatability, and with greater degree of processing efficiency, thereby constituting a clear improvement in the operation of processing circuitry that is performing the testing.

As such, according to some example embodiments as further described herein, a test environment apparatus configured to test a system, such as an embedded system, that is referred to as the system-under-test, may comprise processing circuitry that includes one or more processors for implementing the system-under-test to interact with external test participants via operation with an inner and outer agent having functionalities to manage the interactions, and the timing of the interactions, between the system-under-test and the external test participants, and inner agent having associated functionality, and an outer agent having associated functionality. According to some example embodiments, the test environment apparatus may include or be embodied by processing circuitry comprising one or more processors configured to implement an environment operating a plurality of virtual machines to support dedicated and isolated processing. In this regard, the system-under-test and the inner agent may be implemented on a common virtual machine. The outer agent may be implemented on a separate virtual machine that is referred to as being external to the virtual machine implementing the system-under-test. Additionally, the external test participants may be implemented on separate virtual machines that are external to the virtual machine implementing the system-under-test. According to some example embodiments, the hypervisor that implements one or more of the virtual machines may be implemented in, for example, an operating system such as Linux or the like that can support operation of the system-under-test in virtual machine environment.

As further described herein, the outer agent may be configured to trigger captures of snapshots that store current states of the system-under-test at respective times. Additionally, the outer agent may be configured to intercept messages having timestamps (applied by other inner agents as further described below) that are inbound to the system-under-test. The timestamps may indicate, either directly or indirectly, a time when such inbound messages are expected to be received by the system-under-test. Additionally, the outer agent may be configured to forward the timestamped inbound message to the inner agent.

The inner agent may be configured to receive the timestamped inbound message and evaluate the timestamp. In response to the timestamp indicating a past time (i.e., the expected time of receipt of the message by the system-under-test is in the past), the inner agent may be configured to reject the timestamped inbound message by sending a responsive rejection to the outer agent. In response to receipt of the rejection from the inner agent, the outer agent may be configured to trigger a rollback of the system-under-test based on the timestamp of the rejected massage by using a stored snapshot. The snapshot that is used may be a snapshot for a selected time that provides a state of the system-under-test prior to the timestamp of the rejected message. Accordingly, with the system-under-test reverted back to a virtual time prior to when the subsequently rejected message was expected to be received, the outer agent may be configured to redeliver the timestamped inbound message to the inner agent. The inner agent may be configured to re-evaluate the timestamp with respect to the rolled back virtual time of the system-under-test and permit the message to be received by the system-under-test in a state that is consistent with a real-world condition.

The implementation of a test environment apparatus with the inner agent and the outer agent, according to some example embodiments, leverages a modified virtual machine technology to implement optimistic discrete event simulation, which may be performed in a parallel fashion. In this way, the time required by the simulation models to generate certain stimuli can be decoupled from the time required to run the system-under-test to better represent real-time conditions in a simulated environment. Via such optimistic discrete event simulation, the system-under-test may also be permitted to run at an independent pace. Accordingly, as messages are received by the system-under-test, a current state of the system-under-test may be preserved through the capturing of snapshots of the current state, which includes the data needed to later revert back to the precise environment of the system-under-test. As such, when a message arrives at the system-under-test that would violate causality and timing expectations associated with causality, for example by arriving after the expected time for delivery of the message, then the state of the system-under-test at a time before the errant message arrival and the relevant messages may be replayed to the system-under-test.

According to some example embodiments, through the use of virtual machine technology, according to some example embodiments, the state of the system-under-test may be stored and loaded by a separate virtual machine, thereby avoiding any disruptions in the flow of time experienced by the system-under-test and making this process invisible to the system-under-test. Therefore, according to some example embodiments, to support a virtual time rollback approach describe herein, quick snapshots and managed message flow may be implemented. In this regard, quick snapshots may be performed in a manner that accelerates the speed of capturing and storing the snapshot by utilizing the memory of the hypervisor (i.e., the monitor or virtualizer that creates and runs the virtual machines). As such, the snapshots can be rapidly captured and stored from and to the hypervisor memory directly. Additionally, managed message flow may be implemented to regulate the flow of messages into and out of the system-under-test to ensure that the illusion of the uninterrupted flow of time from the perspective of the system-under-test is maintained.

Conventional virtual machine snapshots can be extremely expensive relative to typical message processing time because such snapshots are delivered and retained in persistent storage. However, the quick snapshots captured according to some example embodiments may be ephemeral and therefore do not need to be provided to persistent storage, but rather to higher speed volatile memory, such as, for example, random access memory (RAM). To further speed the capture and storage process for snapshots, according to some example embodiments, only dirty memory (e.g., changing memory) may need to be tracked and therefore only pages of memory that include changes may be updated into a new snapshot, when a new snapshot capture is triggered. In this manner, the process of capturing quick snapshots may become a memory-only operation that may be dependent only on a number of pages that include changes written to by the system-under-test.

Additionally, according to some example embodiments, the timing for capturing snapshots may be strategically considered. In this regard, according to some example embodiments, a snapshot may be captured, for example, when no pending messaging is expected to be sent. For example, if a snapshot is captured while the system-under-test is successfully sending an outbound message, then the sending of the message may appear to fail when that snapshot is restored and restarted because, for example, no response will be received, despite the system-under-test expecting a response. Therefore, the selection of the timing of when to capture a snapshot can be considered based on, for example, the occurrence of any pending or expected messaging from external participants. The tracking and management of messaging flow with the system-under-test may be implemented in a distributed system involving the inner agent and the outer agent to act as interposing layers between the system-under-test and the stimuli (e.g., messaging with external participants).

Figure 1:
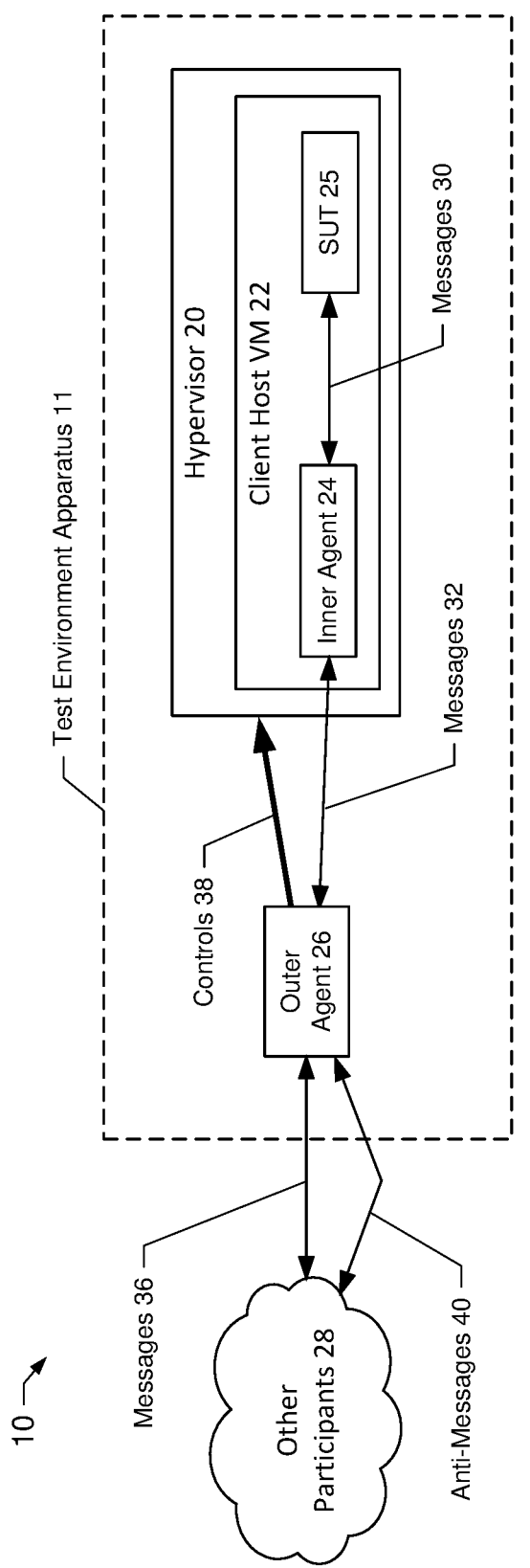
FIG. 1 illustrates a block diagram of an example system for implementing a test environment comprising a test environment apparatus according to some example embodiments.

Having provided a description of some aspects of various example embodiments, FIG. 1 will now be described which illustrates an example system 10 of components and modules for implementing a test environment apparatus according to some example embodiments. In this regard, a test environment apparatus 11, which may be embodied by a host computing device comprising specially configured processing circuitry, may implement one or more hypervisors, including hypervisor 20. As mentioned above, a hypervisor may operate to implement one or more virtual machines on a host computing device. As such, the hypervisor 20 may be configured to implement a client host virtual machine (VM) 22. The client host VM 22 may be, in turn, configured to implement the system-under-test (SUT) 25. Additionally, the client host VM 22 may be configured to implement an inner agent 24. As such, both the system-under-test 25 and the inner agent 24 may be implemented on a common virtual machine in the form of the client host VM 22, which may be a separate, dedicated virtual machine. The system-under-test 25 and the inner agent 24 may have a link for communicating messages 30 between the system-under-test 25 and the inner agent 24.

Externally implemented from the client host VM 22 and possibly the hypervisor 20, the outer agent 26 may be implemented, possibly within the test environment apparatus 11, and may be configured to perform various functionalities. In this regard, the outer agent 26 may be implemented in a manner that permits the outer agent 26 to issue controls 38 to the hypervisor 20 to, for example, request the performance of certain tasks related to the capture and storage of snapshots of the state of the system-under-test. Additionally, the outer agent 26 may communicate controls 38 to control some operations of the inner agent 24 such as, for example, quiescing or halting the operation of the inner agent 24 and controlling other functionalities of the inner agent 24 as described herein. Additionally, the outer agent 26 and the inner agent 24 may implement a messaging link to transfer messages 32 between the outer agent 26 and the inner agent 24.

Additionally, the system 10 that is configured for testing the system-under-test 25 may also include implementations of other participants 28. The other participants 28 may be implemented external to the client host VM 22, but may be implemented on a common virtual machine with the outer agent 26, or on a virtual machine that is separate from the outer agent 26. As such, according to some example embodiments, the other participants 28 may be implemented on the test environment apparatus 11. The other participants 28 may be, for example, simulation models and other entities that are configured to generate simulated stimuli that are representative of real-world events. Such stimuli may be communicated to the system-under-test 25 as messages 36 that may be delivered to the system-under-test 25 and acted upon by the system-under-test 25 to determine outcomes. With respect to the configuration as shown in FIG. 1, the other participants 28 may form a messaging link with the outer agent 26 to support the communication of messages 36 with the system-under-test 25. The messages 36 (which may become or be used to generate messages 32 or messages 30) may therefore take the form of any type of simulated data that may be provided to the system-under-test 25. Such simulated data may be or include simulated sensor data, operational data, status data, control data and instructions, or the like. The other participants 28 may also be configured to receive messages 36 that may originate from system-under-test 25.

Additionally, as further described herein, the outer agent 26 and the other participants 28 may form a link for exchanging anti-messages 40. In this regard, anti-messages 40 may be sent, for example, from the outer agent 26 in response to a virtual time rollback to inform the other participants 28 of the virtual time rollback. In response, the other participants 28 may be configured to reset or revert back to a state where certain messaging that, for example, has been received by the other participants 28 should be ignored and discarded to avoid a response that is out of sync with the rolled back state of the system-under-test 25.

With respect to the operation of the system 10, the system-under-test 25 may be implemented by the client host VM 22, which may be implemented by or with the hypervisor 20 and the hypervisor operating system. Messages to and from the system-under-test 25 may be mediated by the inner agent 24 and the outer agent 26. The inner agent 24 may run alongside (e.g., may be implemented by the same virtual machine as) the system-under-test 25 on the client host VM 22. As mentioned above, the outer agent 26 may be implemented elsewhere, for example, on a separate virtual machine and/or hypervisor.

According to some example embodiments, the inner agent 24 may be configured to perform the following functionalities for testing the system-under-test 25. In this regard, the inner agent 24 may be configured to intercept and manage inbound messages to the system-under-test 25 and outbound messages from the system-under-test 25.

With respect to flow control of outbound messages from the system-under-test 25, the inner agent 24 may be configured to accept the outbound messages from the system-under-test 25 and then timestamp the outbound messages. The timestamp may be an indication of the time (e.g., based on a system clock for the client host VM 22) of the when the outbound message was sent from the system-under-test 25. According to some example embodiments, the inner agent 24 may be configured to generate and apply a timestamp to the outbound messages by encapsulating the messages in an envelope that includes the timestamp.

As further described herein, a state of the inner agent 24 may be controlled by the outer agent 26. In this regard, the outer agent 26 may cause the inner agent 24, via a request (e.g., controls 38), to transition between an active state and a quiescent state. If the inner agent 24 is in the active state, the inner agent 24 may be configured to forward the timestamped outbound message to the outer agent 26. However, if the inner agent 24 is in the quiescent state, via negotiation with the outer agent 26, then the inner agent 24 may be configured to queue the timestamped outbound message (and any later received timestamped outbound messages) to be delivered upon release from the quiescent state by the outer agent 26 and a restart.

While the inner agent 24 is in the quiescent state, other functionalities may be performed, according to some example embodiments. In this regard, while the inner agent 24 is in the quiescent state, the outer agent 26 may be configured to trigger a snapshot of the state of the system-under-test 25. The snapshot may be captured as the conditions and status of the client host VM 22, and the outer agent 26 may control the hypervisor 20 to perform the snapshot capture, while the inner agent 24 is in the quiescent state. As such, client host VM 22 may be configured to resume cleanly from any temporal point during the quiescence of the inner agent 24. According to some example embodiments, the ability to cleanly resume from any time during quiescence may be required because the precise timing of when the snapshot is captured during the quiescence may be indeterminate. As such, no processes on the client host VM 22 may be interacting with external systems (e.g., other participants 28) that have not already been made aware of a rollback during the quiescent state of the inner agent 24. For example, no ongoing TCP (transmission control protocol) connections between the client host VM 22 implementing the system-under-test 25 and the other participants 28 may be active, and messaging from the client host VM 22 implementing the system-under-test 25 to other participants 28 may be halted.

With respect to queueing and delivering inbound messages, the inner agent 24 may be configured to accept inbound messages intended for the system-under-test 25 from the outer agent 26 that have been timestamped. If the timestamp of an inbound message is in the future (due to an earlier virtual time rollback), the inner agent 24 may be configured to queued for later delivery to the system-under-test 25 at the indicated time. If, however, the timestamp of the inbound message indicates that the message is late and should have been received in the past, the inner agent 24 may respond to the outer agent 26 with a late message rejection. Additionally, according to some example embodiments, the inner agent 24 may be configured to queue or reject anti-messages intended for the system-under-test 25 in the same or similar manner, even though an attempt to deliver an anti-message to the system-under-test 25 may cause an error.

According to some example embodiments, the outer agent 26 may be configured to perform some or all of the following functionalities. In this regard, with respect to flow control of inbound messages intended for the system-under-test 25 from other participants 28, the outer agent 26 may be configured to take a number of actions. In response to receiving an inbound message intended for the system-under-test 25, the outer agent 26 may be configured to send a control to the client host VM 22 to quiesce the inner agent 24 and request or trigger the capturing of a snapshot by requesting the client host VM 22 to capture and store the snapshot. The outer agent 26 may then send a control to re-connect or reactivate the inner agent 24 (transitioning out of the quiescent state and into the active state). Finally, the outer agent 26 may also be configured to send the inbound message to the inner agent 24. If the inner agent 24 rejects the inbound message based on the timestamp, the outer agent 26 send a control to roll back the client host VM 22 and thus the system-under-test 25 to a time before the inbound message's timestamp, and then redeliver the inbound message to the inner agent 24.

The outer agent 26 may also be configured to record outbound messages. Additionally, when the inner agent 24 rejects a message as described herein, the outer agent 26 may be configured to send anti-messages in association with each message sent after the time at which the client host VM 22 and the system-under-test 25 has been rolled back to. The outer agent 26 may also be configured to manage time. In this regard, the outer agent 26 may track the time of the client host VM 22 in accordance with the snapshot times, and the outer agent 26 may track messages both sent and received by the inner agent 24. Using snapshot times and the message times, the outer agent 26 may be configured to, for example, execute virtual time rollbacks in coordination with other outer agents and other participants to thereby remove or discard older snapshots and messages.

According to some example embodiments, the ability to perform virtual time rollbacks as described herein, is dependent upon an ability to capture fast snapshots of the state of the system-under-test 25. A virtual machine monitor, such as QEMU, may be used to perform such snapshot captures in response to a request from the outer agent 26 (e.g., controls 38). A typical virtual machine monitor snapshot may capture all state data at a given instant, but because all of the data is involved in the capture, the process of performing the capture may be too slow to support virtual time rollbacks, according to some example embodiments. Further, each snapshot using a typical virtual machine monitor may contain an entire guest memory, which must be copied between the virtual machine monitor process and a disk file. Guest memory may be a virtual address space for use by the system-under-test 25. As such, a modified snapshotting mode may be implemented that handles guest memory differently in order to improve performance of the snapshots.

In this regard, according to some example embodiments, snapshots may be taken to thereby save the guest memory internally in the virtual machine monitor process, as opposed to storing the snapshots in a file, such as a disk file. As such, a significant performance improvement can be realized in this manner, even when the snapshot is stored in memory in a tmpfs (temporary file storage paradigm). However, by using the memory allocated to the virtual machine, the system memory requirements may be greatly increased. Additionally, since the virtual machine memory is being used for storage of the snapshots, the snapshots may not persist after the virtual machine monitor process is terminated.

Additionally, each snapshot, according to some example embodiments, may only contain the portions of memory that have changed since a previous snapshot. Such an approach improves performance and reduces the memory usage. A virtual machine monitor may therefore use a dirty-page bitmap approach to track writes during live migration. As such, this feature may be reused for incremental snapshotting by causing dirty-page tracking to be enabled between snapshots.

A virtual machine monitor may be configured to manage the new incremental snapshots using checkpoint objects, which comprise arrays of pointers to every page in the guest memory. The contents of each page may be stored individually with an associated reference count thereby tracking the number of checkpoints which include that page. According to some example embodiments, memory pages containing, for example, all zeroes may be deduplicated, which reduces memory usage and slightly improves performance. In this regard, when a new checkpoint (e.g., a new snapshot) is created, the virtual machine monitor may make a copy of the previous checkpoint, and then save a copy of every dirty page, thereby overwriting the pointers for those dirty pages. Additionally, if a checkpoint is restored, the virtual machine monitor may overwrite every dirty page and every page that differs between the target checkpoint and the current checkpoint. Also, when a checkpoint is deleted, the virtual machine monitor may check the reference counts of all the pages in that checkpoint and delete the pages that aren't used by any other checkpoint.

Additionally, the non-memory parts of the snapshot such as, for example, the disk state and other device info may be saved to a disk file. According to some example embodiments, since the snapshot format may be maintained (e.g., using a QCOW (copy on write) snapshot format), the snapshots captured in accordance with various example embodiments may be modified relative to standard snapshots. However, operation of the system, according to some example embodiments, may still permit standard snapshots to be loaded. Additionally, according to some example embodiments, the example snapshotting methods described herein may be enabled by default, but the virtual machine monitor may still be configured to create persistent snapshots, which may result in diminished performance.

Figure 2:
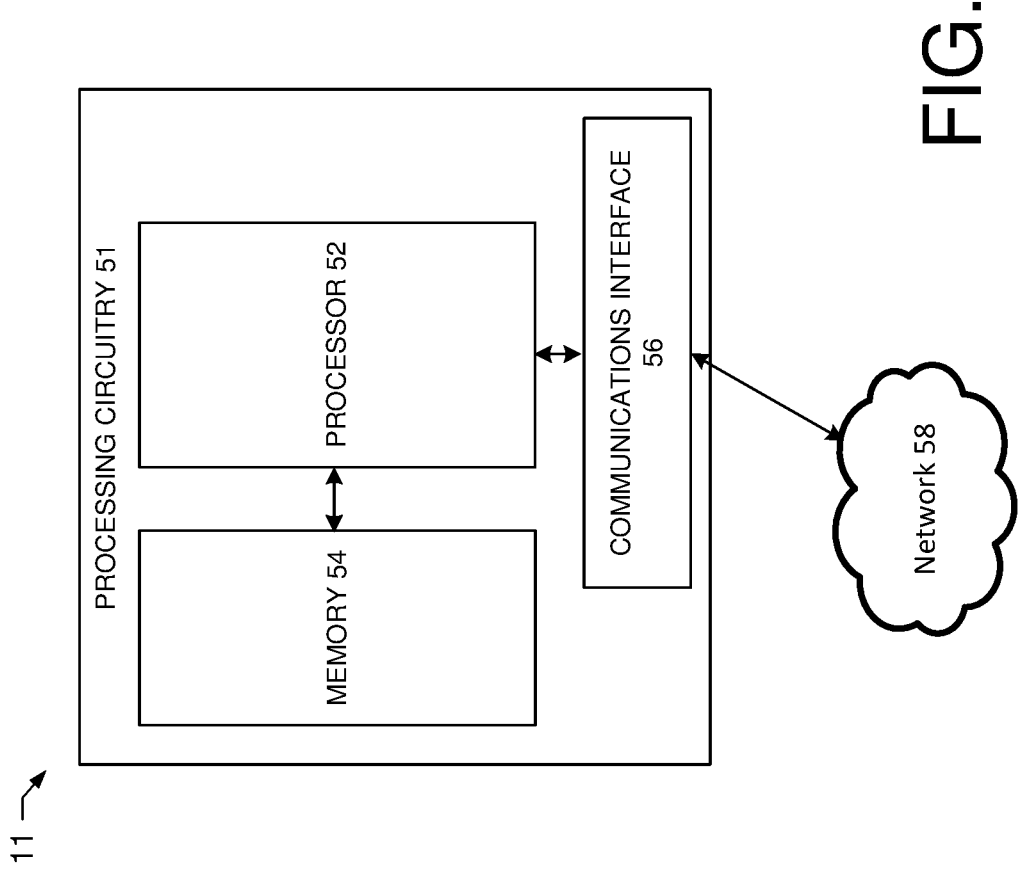
FIG. 2 illustrates a block diagram including example components of an example test environment apparatus according to some example embodiments.

Having described various functionalities and applications that may be implemented by the test environment apparatus 11 and the system 10, FIG. 2 will now be described that illustrates a block diagram of an example hardware configuration of the test environment apparatus 11. Processing circuitry 51, which may be configured to perform some or all of the functionalities of the hypervisor 20, the client host VM 22, the system-under-test 25, the inner agent 24, the outer agent 26, or the other participants 28, is shown with various data and control interfaces. Processing circuitry 51 may comprise a processor 52, a memory 54, and a communications interface 56.

According to some example embodiments, processing circuitry 51 may be in operative communication with or embody, the memory 54, the processor 52, and the communications interface 56. Through configuration and operation of the memory 54, the processor 52, and the communications interface 56, the processing circuitry 51 may be configurable to perform various operations as described herein, including the operations and functionalities described with respect to, for example, the virtual machine platform implemented by hypervisor 20 and the and client host VM 22. In this regard, the processing circuitry 51 may be configured to perform computational processing, memory management, device interface control and monitoring, manage remote communications, and the like, according to an example embodiment. In some embodiments, the processing circuitry 51 may be embodied as a chip or chip set. In other words, the processing circuitry 51 may comprise one or more physical packages (e.g., chips) including materials, components, or wires on a structural assembly (e.g., a baseboard). The processing circuitry 51 may be configured to receive inputs (e.g., via peripheral components), perform actions based on the inputs, and generate outputs (e.g., for provision to peripheral components). In an example embodiment, the processing circuitry 51 may include one or more instances of a processor 52, associated circuitry, and memory 54. As such, the processing circuitry 51 may be embodied as a circuit chip configured (e.g., with hardware, software or a combination of hardware and software) to perform operations described herein.

In an example embodiment, the memory 54 may include one or more non-transitory memory devices such as, for example, volatile or non-volatile memory that may be either fixed or removable. The memory 54 may be a device configured to store information, data, applications, instructions or the like for enabling, for example, the functionalities described with respect to implementing a system test environment that supports virtual time rollback. The memory 54 may operate to buffer instructions and data (e.g., snapshots) during operation of the processing circuitry 51 to support higher-level functionalities, and may also be configured to store instructions for execution by the processing circuitry 51. Additionally, as describe herein, the memory 54 may be configured to store snapshots of the system-under-test 25 and the client host VM 22 for use in virtual time rollback implementations. According to some example embodiments, various data stored in the memory 54 may be generated based on other stored data or the data may be retrieved via the communications interface 56 and stored in the memory 54.

As mentioned above, the processing circuitry 51 may be embodied in a number of different ways. For example, the processing circuitry 51 may be embodied as various processing means such as one or more processors 52 that may be in the form of a microprocessor or other processing element, a coprocessor, a controller or various other computing or processing devices including integrated circuits such as, for example, an ASIC (application specific integrated circuit), an FPGA, a GPU (graphic processing unit), or the like. In an example embodiment, the processing circuitry 51 may be configured to execute instructions stored in the memory 54 or otherwise accessible to the processing circuitry 51. As such, whether configured by hardware or by a combination of hardware and software, the processing circuitry 51 may represent an entity (e.g., physically embodied in circuitry—in the form of processing circuitry 51) capable of performing operations according to example embodiments while configured accordingly. Thus, for example, when the processing circuitry 51 is embodied as an ASIC, FPGA, or the like, the processing circuitry 51 may be specifically configured hardware for conducting the operations described herein. Alternatively, as another example, when the processing circuitry 51 is embodied as an executor of software instructions, the instructions may specifically configure the processing circuitry 51 to perform the operations described herein.

The communications interface 56 may include one or more interface mechanisms for enabling communication with other devices external to the test environment apparatus 11 (e.g., other processing circuitry implementing other participants 28), via, for example, network 58, which may be a local area network, the Internet, a virtual network, or the like, through a direct (wired or wireless) communication link. In some cases, the communications interface 56 may be any means such as a device or circuitry embodied in either hardware, or a combination of hardware and software that is configured to receive or transmit data from/to devices in communication with the processing circuitry 51. The communications interface 56 may be a wired or wireless interface and may support various communications protocols (WIFI, Bluetooth, NFC, cellular, Ethernet, or the like).

Given the context provided in association with the descriptions of FIGS. 1 and 2, FIGS. 3-5 will now be described, which illustrate an example implementation of a virtual time rollback, according to some example embodiments. Specifically referring to FIG. 3, the operation of a system-under-test 102, which may be the same or similar to the system-under-test 25, is shown as the large hatched arrow that progresses to the right with the passage of time. The scenario 100 illustrated in FIG. 3 is representative of the operation of the system-under-test 102, if implemented in the absence of the test environment apparatus 11.

In this regard, various initial conditions may be set at to for the system-under-test 102, and the system-under-test 102 may operate based on these initial conditions and externally implemented dynamic behavioral stimuli that may take the form of messages. Subsequently, at $t_1$, the system-under-test 102 provides an outbound message 110 intended for an external recipient. Later, at $t_2$, the system-under-test 102 receives an inbound message 120 from an external entity. The system-under-test 102 may also send an outbound message 130 at $t_3$. At $t_5$, the system-under-test 102 may receive an inbound message 140. However, the inbound message 140 should have been received at an earlier time, $t_4$, but the message was delayed, for example, due to the involvement of a simulation model that cannot operate to generate messages with real-world timing.

According to some example embodiments, the delay associated with receipt of the inbound message 140 may be rectified through implementation of the system-under-test 102 in a test environment apparatus 11 that is configured to perform a virtual time rollback. In this regard, the scenario 100, now referred to as scenario 100', is shown again in FIG. 4, however with interactions involving the inner agent 104 and the outer agent 106.

Figure 4:
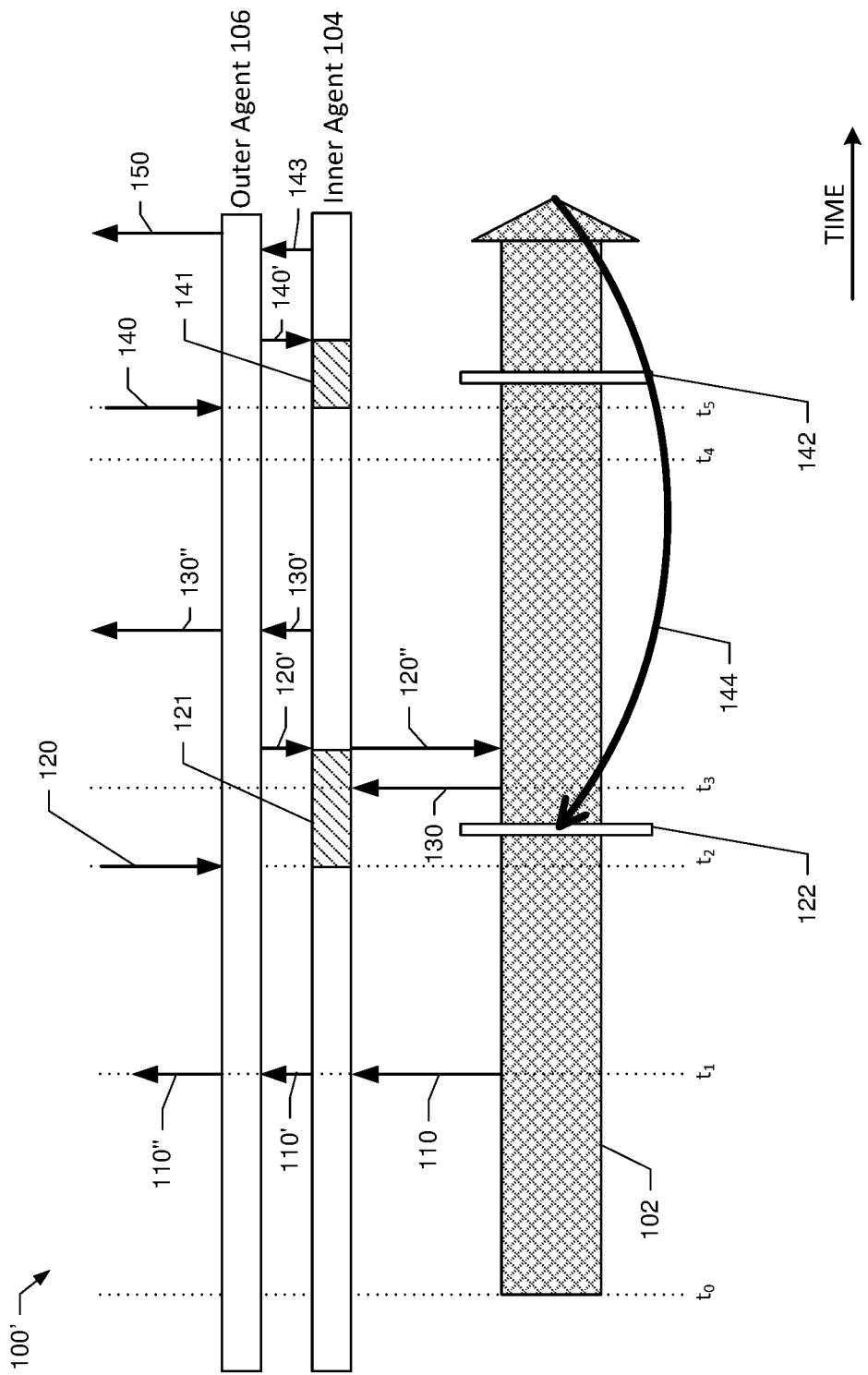
FIG. 4 illustrates a message timing diagram for the example scenario of FIG. 3 implemented by the system-under-test with an example test environment apparatus according to some example embodiments.

In this regard, referring to FIG. 4, various initial conditions may be set at $t_0$ for the system-under-test 102, and the system-under-test 102 may operate based on these initial conditions and externally implemented dynamic behavioral stimuli that may take the form of messages. Subsequently, at $t_1$, the system-under-test 102 may provide an outbound message 110 intended for an external recipient. Initially the outbound message 110 may be intercepted by the inner agent 104. As described above, since the inner agent 104 is not in a quiescent state, the inner agent 104 may apply a timestamp to the outbound message 110, thereby forming outbound message 110', which is delivered to the outer agent 106. The outer agent 106 may record the outbound message 110' for use in an instance where later anti-messages must be sent due to a virtual time rollback to counteract the effect of the outbound message 110' on the external recipient. Having recorded information regarding the outbound message 110' (e.g., address of recipient, type of message, timestamp of message, etc.), the outer agent 106 may forward the outbound message 110' as outbound message 110" to the external entity.

Later, at $t_2$, the inbound message 120 may be sent to the system-under-test 102. However, the outer agent 106 may intercept the inbound message 120 and take a number of actions. In this regard, in response to receipt of the inbound message 120 by the outer agent 106, the outer agent 106 may quiesce the inner agent 104, indicated as hashed section 121, to cause the inner agent 104 to prevent outbound messaging from the system-under-test 102 from being forwarded. Additionally, in response to the receipt of the inbound message 120 by the outer agent 106, the outer agent 106 may also trigger a snapshot 122 to capture and store a current state of the system-under-test 102 in a manner as described above, according to some example embodiments.

However, in the scenario 100', the system-under-test 102 attempts to send an outbound message 130 at $t_3$, during the period of time that the inner agent 104 is in the quiescent state. Accordingly, the inner agent 104 intercepts the outbound message 130, applies a timestamp to the outbound message 130 and places the outbound message 130 in a queue for later delivery, when the outer agent 106 is placed back in the active state.

Meanwhile, having completed the request and process of making a snapshot 122 of the system-under-test 102, the outer agent 106 may transition the inner agent 104 from of the quiescent state and back into the active state. Additionally, with the inner agent 104 now active, the outer agent 106 may forward the inbound message 120 as inbound message 120' to the inner agent 104. The inner agent 104 may evaluate a timestamp of the inbound message 120' and determine whether the inbound message 120' is timely or whether the inbound message 120" should have been received in the past or in the future. In this regard, in scenario 100', receipt of the inbound message 120' is determined to be timely and therefore the inner agent 104 may forward the inbound message 120' as inbound message 120" to the system-under-test 102.

Additionally, since the inner agent 104 is now active again, the inner agent 104 may release the queue of outbound messages that may be been stopped earlier during the quiescent state. In this case, the outbound message 130 had been queued, and therefore the outbound message 130 may now be sent to the outer agent 106 as outbound message 130'. The outer agent 106 may then record the outbound message 130' and forward the outbound message 130' to an external entity as outbound message 130".

At $t_5$, another inbound message 140 may be sent to the system-under-test 102 in accordance with the scenario 100'. The inbound message 140 may be initially intercepted by the outer agent 106, which places the inner agent 104 in a quiescent state and triggers the capture of snapshot 142. The outer agent 106 then reactivates the inner agent 104 and delivers the inbound message 140 to the inner agent 104 as inbound message 140'. The inner agent 104 then evaluates the timestamp of the inbound message 140' and determines that the inbound message 140' is late (e.g., the expected time for receipt as indicated by the timestamp has passed).

In response to determining that the inbound message 140' is late, the inner agent 104 sends a rejection 143 to the outer agent 106. In response to receiving the rejection 143, the outer agent 106 triggers a rollback of the system-under-test 102 based on the timestamp of the inbound message 140. As such, the outer agent 106 orders a rollback to a time before the inbound message 140 should have been received. In this example scenario 100', the outer agent 106 may determine that the system-under-test 102 should rollback to the timing of the snapshot 122, as indicated by the arrow 144 and restart the system-under-test 102 from that point in virtual time. The outer agent 106 may also send anti-messages 150 to counter-act any outbound messages (e.g., outbound message 130) that may have been sent since the time of the snapshot 122.

FIG. 5 illustrates the results of the how the scenario 100', now referred to as scenario 100", proceeds after the virtual time rollback based on the snapshot 122 has occurred. In this regard, the system-under-test 102 proceeds to operate from the time of the snapshot 122, otherwise being unaware of the previous events that occurred after the snapshot 122 was originally captured. The timing indications as described with respect operation of the system-under-test 102 in FIG. 5 are therefore the times as experienced by the system-under-test 102 due to the virtual time rollback. However, in the real-world context these events are occurring at a later time.

Accordingly, in the scenario 100", the system-under-test 102 again attempts to send an outbound message 130 at $t_3$, however, the inner agent 104 is now in an active state when the system-under-test 102 attempts to send the outbound message 130. As such, the outbound message 130 is intercepted by the inner agent 104, and, since the inner agent 104 is not in a quiescent state, the inner agent 104 may apply a timestamp to the outbound message 130, thereby forming outbound message 130', which is delivered to the outer agent 106. The outer agent 106 may record the outbound message 130' and forward the outbound message 130' as outbound message 130" to the external entity.

Additionally, due to the timing of the snapshot 122, the system-under-test 102 has not yet been forwarded the inbound message 120. As such, the outer agent 106 forwards the inbound message 120 as inbound message 120' to the inner agent 104. The inner agent 104 may evaluate a timestamp of the inbound message 120' and determine that the inbound message 120' is timely and therefore the inner agent 104 may forward the inbound message 120' as inbound message 120" to the system-under-test 102.

Additionally, the outer agent 106 forwards the inbound message 140 as inbound message 140' to the inner agent 104, however now, in a timely manner, at $t_4$. As such, when the inner agent 104 evaluates the timestamp of the inbound message 140', the inner agent 104 determines that the inbound message 140' is timely and therefore the inner agent 104 forwards the inbound message 140' as inbound message 140" to the system-under-test 102. In this manner, the system-under-test 102 has reverted back to an environment where the inbound message 140" can be provided, from the perspective of the system-under-test 102, in a timely manner, and a more accurate simulation of real-world timing can be achieved and the system-under-test 102 can respond accordingly.

Now referring to FIG. 6, an example method for testing an embedded system (i.e., a system-under-test) is provided. In this regard, the example method may comprise, at 700, implementing, by a virtual machine operating on processing circuitry, the embedded system-under-test for interaction with external test participants. The example method may also comprise controlling operation of an inner agent and an outer agent. In this regard, the inner agent may be implemented within the virtual machine that is also implementing the system-under-test and the outer agent being implemented external to the virtual machine implementing the system-under-test.

Further, the example method may comprise, at 710, triggering, by the outer agent, snapshots that store current states of the system-under-test at respective times, and, at 720, forwarding, by the outer agent, a timestamped inbound message to the inner agent. At 730, the example method may comprise receiving, by the inner agent, the timestamped inbound message and evaluating the timestamp. At 740, the example method may comprise, in response to the timestamp indicating a past time (the message is late), rejecting the timestamped inbound message by sending, by the inner agent, a rejection to the outer agent. At 750, the example method may comprise triggering, by the outer agent in response to the rejection, a rollback of the system-under-test based on the timestamp using a snapshot for a selected time providing a state of the system-under-test prior to the timestamp. Finally, at 760, the example method may comprise redelivering, by the outer agent, the timestamped inbound message to the inner agent to re-evaluate the timestamp.

According to some example embodiments, the example method may further comprise controlling operation of the outer agent to quiesce the inner agent and trigger a snapshot in response to receipt of inbound messages for the system-under-test. Additionally or alternatively, according to some example embodiments, the example method may comprise controlling the outer agent to reactivate the inner agent prior to forwarding the timestamped inbound message to the inner agent. Additionally or alternatively, the example method may comprise, according to some example embodiments, controlling the inner agent to, in response to being quiesced, timestamp and queue outbound messages from the system-under-test. Additionally or alternatively, the example method may comprise controlling the outer agent to trigger a capturing of a snapshot of a current state of the system-under-test by storing data indicating the current state of the system-under-test within volatile memory of the virtual machine implementing the inner agent, according to some example embodiments.

According to some example embodiments, the example method may additionally or alternatively, comprise controlling the outer agent to trigger a capturing of a snapshot of a current state of the system-under-test by storing data indicating the current state of the system-under-test based on changes from a previous snapshot using a dirty-page bitmap. Additionally, or alternatively, according to some example embodiments, the example method may comprise controlling operation of the outer agent to, responsive to receiving the rejection from the inner agent, distribute anti-messages to external entities associated with outbound messages sent after the selected time. Additionally or alternatively, the example method may comprise, according to some example embodiments, controlling operation of the inner agent to deliver the timestamped inbound message to the system-under-test in accordance with the timestamp in response to the timestamp indicating a future time. Additionally or alternatively, the example method may comprise, according to some example embodiments, implementing the embedded system-under-test based on initial conditions and externally implemented dynamic behavioral stimuli. Additionally or alternatively, according to some example embodiments, the example method may comprise operating in accordance with a system clock that is adjusted with the snapshot used for the rollback.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A test environment apparatus for testing a system-under-test, the system-under-test being an embedded system, the test environment apparatus comprising processing circuitry configured to:
   implement the system-under-test for interaction with external test participants via messaging;
   control operation of an inner agent and an outer agent, the inner agent being implemented within a virtual machine that is also implementing the system-under-test and the outer agent being implemented external to the virtual machine implementing the system-under-test;
   wherein the outer agent is configured to:
      trigger captures of snapshots that store current states of the system-under-test at respective times; and
      forward a timestamped inbound message from one of the external test participants to the inner agent, the timestamped inbound message comprising a timestamp;
   wherein the inner agent is configured to:
      receive the timestamped inbound message and evaluate the timestamp; and
      in response to the timestamp indicating a past time, reject the timestamped inbound message by sending a rejection to the outer agent;
   wherein the outer agent is further configured to, in response to the rejection, trigger a rollback of the system-under-test based on the timestamp using a snapshot for a selected time providing a state of the system-under-test prior to the timestamp and redeliver the timestamped inbound message to the inner agent to re-evaluate the timestamp.

2. The test environment apparatus of claim 1, wherein the processing circuitry is further configured to control operation of the outer agent to quiesce the inner agent and trigger a snapshot in response to receipt of inbound messages for the system-under-test.

3. The test environment apparatus of claim 2, wherein the processing circuitry is further configured to control the outer agent to reactivate the inner agent prior to forwarding the timestamped inbound message to the inner agent.

4. The test environment apparatus of claim 2, wherein the processing circuitry is further configured to control the inner agent to, in response to being quiesced, timestamp and queue outbound messages from the system-under-test.

5. The test environment apparatus of claim 1, wherein the processing circuitry is further configured to control the outer agent to trigger a capture of a snapshot of a current state of the system-under-test by storing data indicating the current state of the system-under-test within volatile memory of a virtual machine implementing the inner agent.

6. The test environment apparatus of claim 1, wherein the processing circuitry is further configured to control the outer agent to trigger a capture of a snapshot of a current state of the system-under-test by storing data indicating the current state of the system-under-test relative to changes from a previous snapshot using a dirty-page bitmap.

7. The test environment apparatus of claim 1, wherein the processing circuitry is further configured to control operation of the outer agent to, responsive to receiving the rejection from the inner agent, distribute anti-messages to the external test participants associated with outbound messages sent after the selected time.

8. The test environment apparatus of claim 1, wherein the processing circuitry is further configured to control operation of the inner agent to deliver the timestamped inbound message to the system-under-test in accordance with the timestamp in response to the timestamp indicating a future time.

9. The test environment apparatus of claim 1, wherein the processing circuitry is further configured to implement the embedded system-under-test based on initial conditions and externally implemented dynamic behavioral stimuli.

10. The test environment apparatus of claim 1, wherein the processing circuitry is further configured to operate in accordance with a system clock that is adjusted with the snapshot used for the rollback.

11. A method implemented within a test environment apparatus for testing a system-under-test, the system-under-test being an embedded system, the method comprising:
    implementing, by a virtual machine operating on processing circuitry, the embedded system-under-test for interaction with external test participants via messaging;
    controlling operation of an inner agent and an outer agent, the inner agent being implemented within the virtual machine that is also implementing the system-under-test and the outer agent being implemented external to the virtual machine implementing the system-under-test;
    triggering, by the outer agent, snapshots that store current states of the system-under-test at respective times;
    forwarding, by the outer agent, a timestamped inbound message from one of the external test participants to the inner agent, the timestamped inbound message comprising a timestamp;
    receiving, by the inner agent, the timestamped inbound message and evaluating the timestamp;
    in response to the timestamp indicating a past time, rejecting the timestamped inbound message by sending, by the inner agent, a rejection to the outer agent;
    triggering, by the outer agent in response to the rejection, a rollback of the system-under-test based on the timestamp using a snapshot for a selected time providing a state of the system-under-test prior to the timestamp; and
    redelivering, by the outer agent, the timestamped inbound message to the inner agent to re-evaluate the timestamp.

12. The method of claim 11 further comprising controlling operation of the outer agent to quiesce the inner agent and trigger a snapshot in response to receipt of inbound messages for the system-under-test.

13. The method of claim 12 further comprising controlling the outer agent to reactivate the inner agent prior to forwarding the timestamped inbound message to the inner agent.

14. The method of claim 12 further comprising controlling the inner agent to, in response to being quiesced, timestamp and queue outbound messages from the system-under-test.

15. The method of claim 11 further comprising controlling the outer agent to trigger a capturing of a snapshot of a current state of the system-under-test by storing data indicating the current state of the system-under-test within volatile memory of the virtual machine implementing the inner agent.

16. The method of claim 11 further comprising controlling the outer agent to trigger a capturing of a snapshot of a current state of the system-under-test by storing data indicating the current state of the system-under-test based on changes from a previous snapshot using a dirty-page bitmap.

17. The method of claim 11 further comprising controlling operation of the outer agent to, responsive to receiving the rejection from the inner agent, distribute anti-messages to external entities associated with outbound messages sent after the selected time.

18. The method of claim 11 further comprising controlling operation of the inner agent to deliver the timestamped inbound message to the system-under-test in accordance with the timestamp in response to the timestamp indicating a future time.

19. The method of claim 11 further comprising implementing the embedded system-under-test based on initial conditions and externally implemented dynamic behavioral stimuli.

20. The method of claim 11 further comprising operating in accordance with a system clock that is adjusted with the snapshot used for the rollback.

* * * * *